United States Patent [19]

Cullen et al.

[11] 4,272,264
[45] Jun. 9, 1981

[54] ADSORBENT PACKAGE

[75] Inventors: John S. Cullen, Buffalo; Paul W. Huber, Depew, both of N.Y.

[73] Assignee: Multiform Desiccant Products, Inc., Buffalo, N.Y.

[21] Appl. No.: 703,979

[22] Filed: Jul. 9, 1976

Related U.S. Application Data

[63] Continuation of Ser. No. 495,883, Aug. 8, 1974, abandoned, which is a continuation of Ser. No. 293,677, Sep. 29, 1972, abandoned.

[51] Int. Cl.$^3$ .................. B01D 27/02; B01D 53/04
[52] U.S. Cl. .................. 55/387; 210/282; 210/DIG. 6; 53/373
[58] Field of Search .............. 55/316, 387, 484, 486, 55/492, 527, 528; 210/282, 484, DIG. 6; 53/39, 371, 373; 156/306

[56] References Cited

U.S. PATENT DOCUMENTS

| | | | |
|---|---|---|---|
| 2,336,797 | 12/1943 | Maxwell | 55/528 |
| 2,390,386 | 12/1945 | Radford | 28/73 |
| 2,475,241 | 7/1949 | Hermanson | 161/150 |
| 2,521,984 | 9/1950 | Lang | 55/486 |
| 2,578,324 | 12/1951 | Southwick, Jr. | 55/387 |
| 2,606,850 | 8/1952 | Piazze | 53/373 |
| 2,693,246 | 11/1954 | Marcheck | 55/492 X |
| 2,908,064 | 10/1959 | Lauterbach et al. | 28/73 X |
| 2,913,863 | 11/1959 | Sylvester et al. | 53/373 |
| 2,948,999 | 8/1960 | Schlayer et al. | 53/373 |
| 3,038,187 | 6/1962 | Nathanson | 161/149 |
| 3,087,845 | 4/1963 | Patterson | 156/306 |
| 3,286,433 | 11/1966 | Johnson et al. | 53/373 |
| 3,316,904 | 5/1967 | Wall et al. | 55/528 |
| 3,333,404 | 8/1967 | Klun | 55/492 |
| 3,355,857 | 12/1967 | Tobey | 53/373 |
| 3,369,547 | 2/1968 | Sack et al. | 161/149 X |
| 3,388,536 | 6/1968 | Nash | 55/492 |
| 3,620,894 | 11/1971 | Oates | 161/149 X |
| 3,734,296 | 5/1973 | Proctor et al. | 210/288 |
| 3,755,994 | 9/1973 | Bidiwala | 55/387 |

Primary Examiner—David L. Lacey
Attorney, Agent, or Firm—Joseph P. Gastel

[57] ABSTRACT

An adsorbent package is provided which has a high ratio of adsorbent weight to package surface area. The package comprises a container having an enclosing wall formed of a sheet of thermoplastic fibrous material folded upon itself to provide superimposed edge portions which are fused together into a continuous welded seam, the container being filled with an adsorbent material, preferably particulate desiccant. The thermoplastic fibrous sheet material preferably has a fiber tie down on its side which constitutes the outside of the container, and also is preferably a felted polypropylene.

14 Claims, 8 Drawing Figures

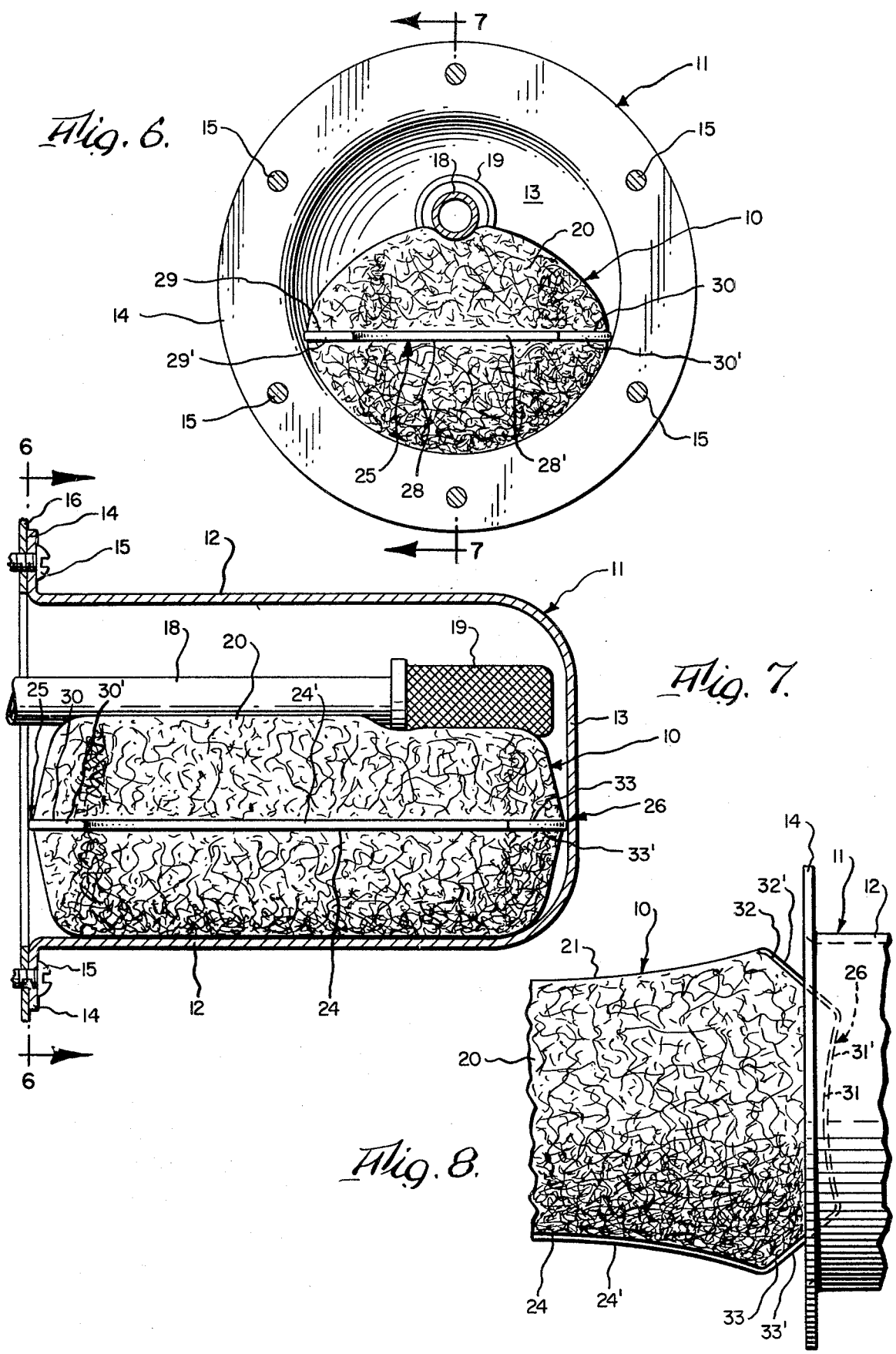

ADSORBENT PACKAGE

This is a continuation, of application Ser. No. 495,883 filed on Aug. 8, 1974 now abandoned, which is a continuation of application Ser. No. 293,677, filed on Sept. 29, 1972, now abandoned.

BACKGROUND OF THE INVENTION

An adsorbent package such as a foraminous bag of particulate desiccant is particularly useful as a proximity drier in an automotive air conditioner or as a flow-through filter-drier combination module for a liquid refrigerant in-line installation. As heretofore constructed such an adsorbent package included a bag made of some natural fiber such as felted wool stitched along superimposed edge portions and filled with a suitable adsorbent material. The wool bag would lint, loosing fibers which could flow downstream and collect on a valve seat or the like in a refrigeration system and cause a malfunction. Also, the stitching of the bag wall material provided not only a bulky seam but a weak one and further allowed adorbent material to escape from the container through the holes made by a needle when stitching the plies of the sheet material. This last adsorbent material could also contribute to a downstream malfunction. Further, the seam allowance along the row of stitching increased the volumetric massiveness of the package.

SUMMARY OF THE INVENTION

The present invention provides an adsorbent package which does not possess the aforementioned disadvantages of the prior art adsorbent packages.

More specifically, an object of the present invention is to provide an adsorbent package which has a high ratio of adsorbent weight to package surface area, thereby providing a compact package particularly useful in an application where space is limited such as a refrigerant receiver in an automotive air conditioning apparatus.

Another object is to provide such an adsorbent package which contains the adsorbent material within a container having a fibrous wall structure wherein the fibers are tied down on the outside of the wall to minimize linting.

Another object is to provide such an adsorbent package which has a container wall formed from a thermoplastic fibrous sheet material folded upon itself to provide superimposed edge portions which are fused together into continuous welded seams which are neat, strong and disallow attrition of the adsorbent material confined within the container.

A further object is to provide such an adsorbent package shaped into elongated pillow-like configuration having diagonal corners formed by welded seams which render the package compact and also provide angled corners which act as cam surfaces to aid in inserting the package within a housing.

According to the present invention, an adsorbent package is provided having a high ratio of adsorbent weight to package surface area, which comprises a container having an enclosing wall of thermoplastic fibrous sheet material including superimposed edge portions which are fused together to provide a continuous welded seam and filled with adsorbent material.

These and other objects and advantages of the present invention will be apparent from the following detailed description of a preferred embodiment illustrated in the accompanying drawings.

BRIEF DESCRIPTION OF THE DRAWINGS

FIG. 6 is a view of a cup-shaped receiver for refrigerant in automotive air conditioning apparatus, this view looking into the mouth or open end of the receiver and showing an adsorbent package of the present invention arranged therein, this view being a section taken on line 6—6 of FIG. 7.

FIG. 7 is a longitudinal sectional view of such receiver with the inventive adsorbent package arranged therein illustrated in elevation, this view being taken on line 7—7 of FIG. 6.

FIG. 8 is a fragmentary view illustrating the relationship of the diagonal edges of the inventive adsorbent package to the wall of receiver at the mouth thereof when such package is inserted into this receiver.

DETAILED DESCRIPTION OF PREFERRED EMBODIMENT

Figure 1:
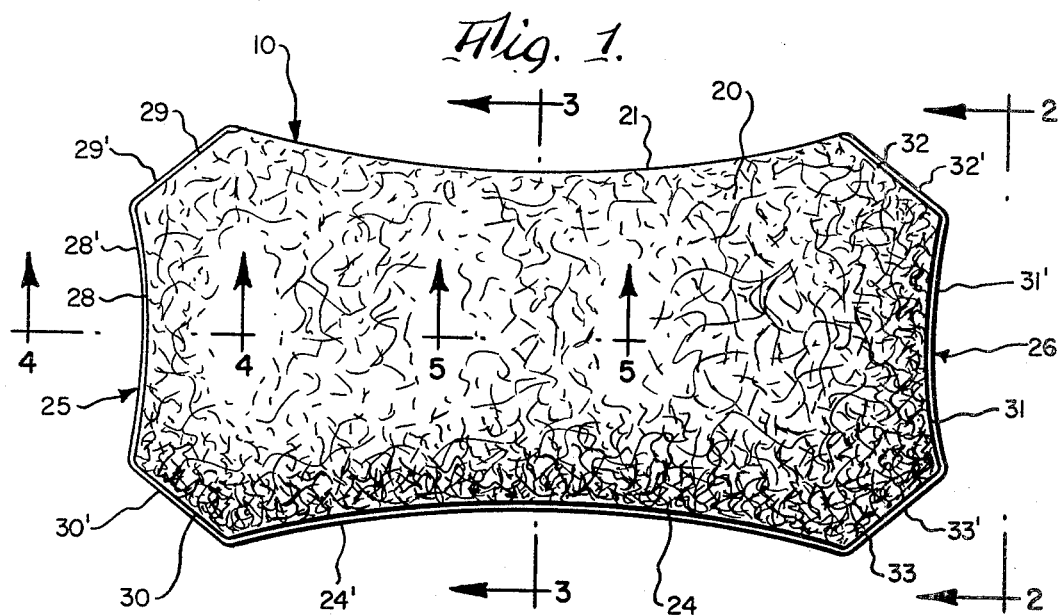
FIG. 1 is a top plan view of an adsorbent package constructed in accordance with the principles of the present invention and constituting a preferred embodiment.
Figure 2:
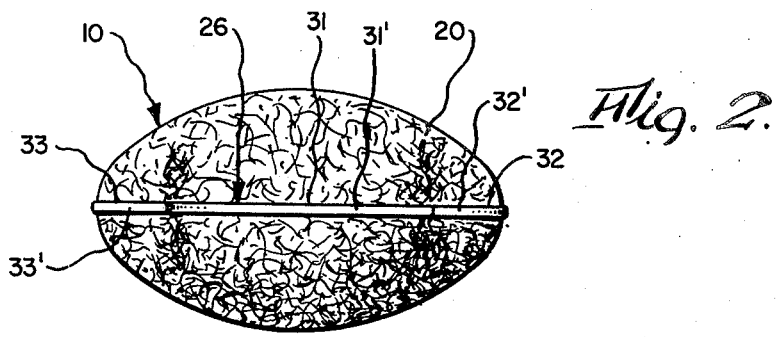
FIG. 2 is an end view of the right end of the adsorbent package as shown in FIG. 1, this view being taken on line 2—2 of FIG. 1.
Figure 3:
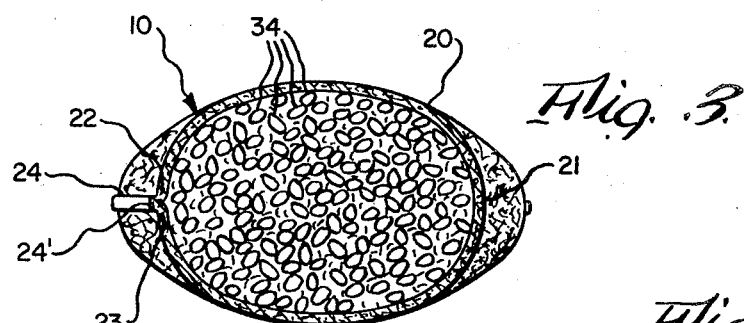
FIG. 3 is a transverse sectional view thereof, taken on line 3—3 of FIG. 1.

The adsorbent package having a preferred embodiment of the present invention is represented generally by numeral 10 and is shown in FIGS. 6–8 in association with a cup-shaped receiver 11 for refrigerant in automotive air conditioning apparatus, which constitutes a particularly advantageous application of the inventive adsorbent package. Receiver 11 is shown as a cup-shaped sheet metal member having a cylindrical side wall 12, closed at one end by end head 13 and open at its other end or mouth which has an outturned annular attaching flange 14 removably secured as by screw fasteners 15 to a support plate 16. Arranged longitudinally in receiver 11 to one side of center is a conduit or tube 18 having a screen 19 at its inner end and through which refrigerant flows.

As is well known, such refrigerant must be kept free of moisture. For that purpose, the inventive adsorbent package 10 is shown in FIGS. 6 and 7 arranged between tube 18 and the receiver wall 12.

Referring now particularly to FIGS. 1–5, the inventive adsorbent package 10 is shown as an elongated generally pillow-shaped container having an enclosing wall 20 of thermoplastic fibrous sheet material. This container is made from a blank of such sheet material of appropriate outline, folded upon itself along one longitudinal side 21. As a result of such folding, the edges of the blank provide superimposed edge portions 22, 23 along the opposite longitudinal side indicated at 24, and also along the opposite ends of the container severally indicated at 25 and 26. End 25 includes an intermediate portion 28, a first diagonal portion 29 extending diagonally between folded side 21 and intermediate portion 28, and a second diagonal portion 30 extending diagonally between side 24 and intermediate portion 28. Similarly, end 26 includes an intermediate portion 31, a first diagonal portion 32 extending diagonally between folded side 21 and intermediate portion 31, and a second diagonal portion 33 extending diagonally between side 24 and intermediate portion 31.

Figure 4:
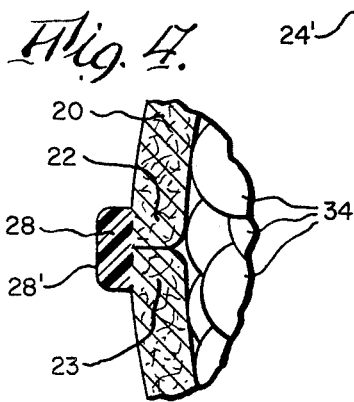
FIG. 4 is an enlarged fragmentary transverse sectional view of a fused seam at one end of the package, this view being taken on line 4—4 of FIG. 1.
Figure 5:
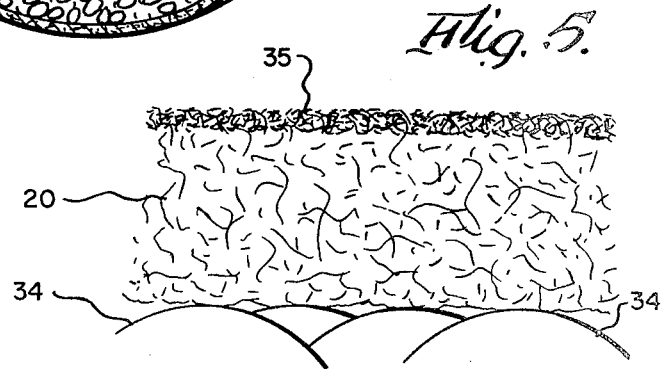
FIG. 5 is a greatly enlarged fragmentary sectional view through the fibrous sheet material constituting the container wall of said package, this view being taken on line 5—5 of FIG. 1.

The superimposed edge portions 22 and 23 extend along the longitudinal side 24 and each of the end portions 28-33. All of these superimposed edge portions are fused together to provide a continuous welded seam or joint indicated at 28′ for the intermediate end potion 28 depicted typically in FIG. 4. It will be understood that the welded seam 28′ illustrated in FIG. 4 is representative of the welded seam along longitudinal side 24 and end portions 28–33. The welded seam along this side and these end portion is indicated at 24′ and 28′-33′, respectively. The various welded seams 24′ and 28′-33′ severally are uninterrupted or continuous along their individual lengths and also where their ends meet are fused together to provide collectively a continuous welded seam beginning and ending where diagonal end seams 29′ and 32′ terminate on folded side 21.

Such collective continuous welded seam may be provided in any suitable manner. One way is to clamp the superimposed edge portions of the sheet material and expose the edges to heat above the melting point of the thermoplastic material of which the sheet is composed so that the fibers will melt and fuse together to provide the welded seam. Apparatus for accomplishing this forms no part of the present invention and hence is not disclosed. Such apparatus may take the form generally of that disclosed in such patents as U.S. Pat. Nos. 2,994,361 and 3,087,845.

A bag may be made by sealing the side 24 and one of the ends 25 or 26, leaving the other end open. Through such open end the adsorbent material 34 in particulate form may be introduced to fill the bag, following which the open end is fused closed by a welded seam. While this closing end seam would be external, the bag previously formed and prior to filling may have been turned inside out so that the welded seams along the longitudinal side and the end first closed will be on the inside rather than on the outside of the container. However, in the drawings all welded seams are shown as arranged on the outside of the container.

The thermoplastic fibrous sheet material 20 may be constructed in any suitable manner to provide a foraminous wall for the container 10. Thus the fibrous sheet material may be woven or non-woven, and preferably is felted of fibers one to two inches in length. Fibers of polypropylene are preferred although the fibers may be formed of any suitable thermoplastic material.

In order to reduce linting the fibrous sheet material 20 preferably has a fiber tie down on that side of the sheet which is arranged on the outside of the container 10. This is depicted as best can be done in FIG. 5 where the fibers in the upper surface region 35 are bonded together to form a foraminous crust, whereas the fibers on the inside surface engaged by the particulate adsorbent are not so tied down. This tying down of the surface fibers on one side of the sheet may be accomplished in any suitable manner as by passing the sheet through calendering rolls one of which is heated so that the hot roll softens the fibers engaged thereby which are simultaneously pressed together and bond together quickly as they cool leaving the roll. Another technique of tying down the fibers on one side of the sheet is to glaze them by exposure to a flame. Other suitable tying down techniques may be employed.

Insofar as the adsorbent material 34 is concerned, any suitable material having adsorbent properties, and keeping in mind the application for the package may be used. While a particulate desiccant is preferred for the adsorbent material, the invention contemplates such a material broadly including for example, activated charcoal. Suitable desiccant, a species of adsorbent material in bead, pellet or granular form such as silical gel, metal alumino silicate, alumina, calcium sulphate, and the like, are contemplated.

From the foregoing, it will be seen that the embodiment of the invention illustrated and described provides an elongated generally pillow-shaped foraminously-walled container having a fold along one longitudinal side, a neat and strong continuous welded seam along the opposite longitudinal side, and similar welded seams along the opposite ends which have their corners cut off in effect, to provide a compact package containing particulate adsorbent material. Such package is characterized by a high ratio of weight of adsorbent material to the surface area of the package. The welded seams are exceedingly strong and while somewhat stiff like a rib, are still flexible enough to allow some deformation in shape of the package. These welded seams also are closed, as opposed to being open as in the case of stitching, and do not permit adsorbent material to escape through the seams.

As depicted in FIG. 8, the welded seams 32′ and 33′ along diagonal end portions 32 and 33 provide inclined cam surfaces adapted to engage the rim at the mouth of receiver 11 and facilitate guiding the package 10 into this receiver. Some distortion of the container wall 20 of the package 10 will occur as this package is slid into the receiver to conform to the wall of this receiver and the tube 18 and screen 19 engaged by the package, as depicted in FIGS. 6 and 7.

It will also be seen that the package 10 provides a compact adsorbent package fitting nicely into the limited space available in the receiver. Such receiver in automative air conditioners is ever being reduced in size and it is therefore highly important that the maximum amount of adsorbent material in a confined condition is readily insertable in the receiver. It is also desirable to be able, upon removing the fasteners 15 securing the receiver 16, to remove a used package 10 and replace it with a fresh package, following which the receiver can be resecured to its mounting plate 16.

What is claimed is:

1. An adsorbent package comprising adjacent continuous foraminous wall portions of thermoplastic fibrous meltable and heat-fusible sheet material composed of fibers and defining an enclosure, adsorbent material confined completely within said enclosure, superimposed edge portions on said wall portions, said superimposed edge portions including fibers which are melted out to and including the outermost edges of said wall portions, said melted fibers at said superimposed edge portions being completely fused together to provide a welded seam joining said superimposed edge portions, said wall portions including an outer surface, fiber tie-down means for tying down the fibers of said material on substantially said entire outer surface of said wall portions, said fiber tie-down means permitting said foraminous fibrous sheet material to remain in condition to permit flow of fluids therethrough, whereby said melted edge portions at said completely fused welded seam and said tied-down fibers on said outer surface of said wall portions provide a substantially completely tied-down outer surface on said package to prevent fibers of said fibrous sheet material from linting into the fluid in which said adsorbent package is placed.

2. An adsorbent package as set forth in claim 1 wherein said welded seam is located at the outermost edges of said wall portions.

3. An adsorbent package as set forth in claim 1 wherein said fibrous sheet material is felted.

4. An adsorbent package as set forth in claim 1 wherein said welded seam comprises a somewhat stiff rib-like structure formed from said superimposed edge portions which are completely melted and fused into said seam.

5. An adsorbent package as set forth in claim 1 which is fabricated from a single piece of said sheet material which is folded over on itself to provide said adjacent wall portions, whereby said welded seam is located on only those edges of said package other than at said folded-over portion.

6. An adsorbent package as set forth in claim 5 wherein said package is substantially rectangular in form and said welded seam comprises a first welded seam portion opposite to said folded-over portion, and second welded seam portions extending substantially between said folded-over portion and said first welded seam portion.

7. An adsorbent package as set forth in claim 6 wherein said welded seam includes diagonal welded seam portions extending between said second welded seam portions and said folded-over portion.

8. An adsorbent package as set forth in claim 7 wherein said welded seam includes second diagonal welded seam portions extending between said second welded seam portions and said first welded seam portion.

9. An adsorbent package as set forth in claim 6 wherein said welded seam includes diagonal welded seam portions extending between said second welded seam portions and said first welded seam portion.

10. An adsorbent package as set forth in claim 1 wherein said sheet material is felted polypropylene.

11. An adsorbent package as set forth in claim 1 wherein said fiber tie-down means comprises an outer foraminous crust on said wall portions.

12. An adsorbent package as set forth in claim 11 wherein said outer foraminous crust comprises fibers of said wall portions which have been fused.

13. An adsorbent package as set forth in claim 12 wherein said welded seam comprises a somewhat stiff rib-like structure formed from said superimposed edge portions which are completely melted and fused into said seam.

14. An adsorbent package as set forth in claim 1 wherein said wall portions are unperforated.

* * * * *